(12) United States Patent
Long et al.

(10) Patent No.: US 7,961,863 B2
(45) Date of Patent: *Jun. 14, 2011

(54) SYSTEM AND METHOD FOR MAJOR TRADING AREA (MTA) ROUTING IN A TELECOMMUNICATIONS NETWORK

(75) Inventors: Bill Long, Louisville, CO (US); Dan Jordan, Superior, CO (US); Alissa Baan, Westminster, CO (US); Janis Griffin, Longmont, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/546,511

(22) Filed: Aug. 24, 2009

(65) Prior Publication Data

US 2009/0310773 A1 Dec. 17, 2009

Related U.S. Application Data

(63) Continuation of application No. 12/115,454, filed on May 5, 2008, now Pat. No. 7,580,516.

(60) Provisional application No. 60/916,195, filed on May 4, 2007.

(51) Int. Cl.
*H04M 7/00* (2006.01)

(52) U.S. Cl. .............. 379/219; 379/220.01; 379/221.14; 379/222

(58) Field of Classification Search .............. 379/201.12, 379/219, 220.01, 221.01, 221.02, 221.14, 379/222
See application file for complete search history.

(56) References Cited

U.S. PATENT DOCUMENTS

| | | | |
|---|---|---|---|
| 6,934,378 B2 | 8/2005 | Baker et al. | |
| 7,088,806 B2 | 8/2006 | Liu | |
| 7,308,267 B2 | 12/2007 | Goering et al. | |
| 7,580,516 B2 * | 8/2009 | Long et al. ............ | 379/219 |

* cited by examiner

*Primary Examiner* — Harry S Hong (57) ABSTRACT

A method includes determining all telephone numbers to which a selected CLLI can terminate calls, wherein the CLLI is associated with one or more major trading areas (MTAs), creating a FROM-TO relationship between at least a subset of TNs in the one or more MTAs and the TNs to which the selected CLLI can terminate calls, and provisioning the FROM-TO relationship on a core routing engine accessible to a switch. A system includes a local route manager (LRM) configured to receive input designating a CLLI as available for intra-MTA routing, the CLLI being associated with one or more MTAs, a cluster generator configured to create a first set of all telephone numbers (TNs) handled by the CLLI, a second set of selected TNs in the one or more MTAs, and an association between the first set and the second set, and a provisioning module configured to provision the association between the first set and the second set on a core routing engine to identify calls between TNs of the sets as local in jurisdiction.

22 Claims, 8 Drawing Sheets

SYSTEM AND METHOD FOR MAJOR TRADING AREA (MTA) ROUTING IN A TELECOMMUNICATIONS NETWORK

RELATED APPLICATIONS

This application is a continuation of U.S. Nonprovisional application Ser. No. 12/115,454, filed May 5, 2008, now pending, which claims the benefit of U.S. Provisional Application No. 60/916,195, filed May 4, 2007, both of which are incorporated by reference for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2008 Level 3 Communications, LLC.

TECHNICAL FIELD

Embodiments of the present invention generally relate to network communications. More specifically, embodiments relate to a system and method for MTA routing in a telecommunications network.

BACKGROUND

Some telecommunications carriers may negotiate agreements with tier 1 wireless carriers, whereby the telecommunications carriers are allowed to send communication traffic (e.g., calls) directly to the wireless carriers, instead of "transiting" the traffic through a Regional Bell Operating Company (RBOC) network, for example. The terms of these agreements are typically "bill and keep" for traffic that is intra-"Major Trading Area" (MTA). This means that the telecommunications carriers may terminate any minute destined for a wireless carrier with whom they have a signed contract via a connection directly to the carrier, so long as the rate centers associated with the calling and called telephone numbers (TNs) are within the same MTA.

It is with respect to these and other problems that embodiments of the present invention have been created.

SUMMARY

Embodiments of the present invention include systems and methods for Major Trading Area routing in a telecommunications network. In some embodiments, intra-MTA calls are routed directly to a terminating carrier network if the calls are eligible for direct routing. In some embodiments a call is eligible if one or more of the terminating carrier network or the originating carrier network are wireless carrier networks. Routing a call directly to the terminating carrier network involves routing the call over an available direct connection to the terminating carrier network. Routing directly to the terminating carrier network may involve bypassing a Local Exchange Carrier (LEC) network, which may be a Regional Bell Operating Company (RBOC) network.

An embodiment of a method includes receiving an intra-Major Trading Area (MTA) call, determining whether the intra-MTA call satisfies terms of use of a direct connection to a terminating network, and routing the intra-Major Trading Area (MTA) call directly to the terminating network via the direct connection if the intra-MTA call satisfies the terms of use of the direct connection.

Another embodiment of a method for routing calls includes determining that a received intrastate call is an intra-MTA call, determining whether the intra-MTA call satisfies terms of use of a direct connection bypassing a Local Exchange Carrier; and routing the intra-MTA call for termination via the direct connection if the intra-MTA call satisfies terms of use of the direct connection.

Yet another embodiment of a method for routing a call includes receiving a call from an originating carrier network to be terminated at a terminating carrier network, wherein one or more of the originating carrier network and the terminating carrier network are wireless carrier networks, determining if the call is an intra-MTA call, and if the call is an intra-MTA call, routing the call directly to the terminating carrier network via an available direct connection.

Another embodiment of a method includes determining all telephone numbers to which a selected CLLI can terminate calls, wherein the CLLI is associated with one or more major trading areas (MTAs), creating a FROM-TO relationship between at least a subset of TNs in the one or more MTAs and the TNs to which the selected CLLI can terminate calls, and provisioning the FROM-TO relationship on a core routing engine accessible to a switch. The method may further include provisioning all telephone numbers to which the selected CLLI can terminate calls as a group on the core routing engine. The method may still further include provisioning the at least a subset of TNs as a group on the core routing engine. The method may yet further include determining a rate center associated with the selected CLLI. The method may still further include determining the at least a subset of TNs in the one or more MTAs by looking up TNs of the rate center in a LERG data base.

In an embodiment, the subset of TNs in the one or more MTAs includes only TNs associated with wireless endpoints. The method may further include determining the at least a subset of TNs in the one or more MTAs based on an attribute specified in a traffic exchange agreement. If the attribute specifies only wireless originated calls, then determining the at least a subset of TNs in the one or more MTAs may include determining TNs in the one or more MTAs that are associated with wireless networks. The method may further include creating a first cluster of TNs in the form NPA-NXX-X that the CLLI can terminate calls to, creating a second cluster of TNs in the form NPA-NXX that are in the one or more MTAs, and wherein creating the FROM-TO relationship comprises associating the first cluster with the second cluster.

The method may still further include automatically updating the first cluster and the second cluster in response to a change in an inventory of switch data. The method may yet further include automatically updating the first cluster and the second cluster in response to a change to a traffic exchange agreement affecting the CLLI. In one embodiment the FROM-TO relationship designates intra-MTA calls that are of local jurisdiction.

An embodiment of a system includes a local route manager (LRM) configured to receive input designating a CLLI as available for intra-MTA routing, the CLLI being associated with one or more MTAs, a cluster generator configured to create a first set of all telephone numbers (TNs) handled by the CLLI, a second set of selected TNs in the one or more MTAs, and an association between the first set and the second set, and a provisioning module configured to provision the association between the first set and the second set on a core routing engine to identify calls between TNs of the sets as local in jurisdiction. The cluster generator can determine the first set of TNs by looking up TNs of the CLLI in a LERG database. The input may include and attribute designating whether wireless only originated calls can be routed via the CLLI. Based on the attribute, the cluster generator may insert only TNs associated with wireless networks in the second set of TNs.

In one embodiment of the system the cluster generator is further configured to automatically update the first and second sets of TNs based on changes to an inventory of switch data. Still further, the cluster generator may be configured to automatically update the first and second sets of TNs based on user input related to contractual provisions affecting the CLLI.

Another embodiment of a method includes determining that a first telephone number (TN) and a second TN are associated with one or more major trading areas (MTAs), such that a call therebetween is an intra-MTA call, determining whether a call made between the first TN and the second TN satisfies terms of use of a direct connection bypassing to a selected CLLI, and provisioning the first TN and the second TN in a local jurisdiction relationship if a call between the first TN and the second TN satisfies terms of use of the direct connection. The direction connection may bypass a LEC network.

The method may further include adding the first TN to a first cluster of TNs and the second TN to a second cluster. Still further, the method may include provisioning the first cluster and the second cluster on a core routing engine. Determining that the first TN and the second TN are associated with one or more MTAs may include determining a rate center associated with the first TN, and looking up telephone numbers associated with the rate center in a LERG database. In some embodiments, the first TN has the form NPA-NXX if the first TN is not associated with a wireless endpoint and the form NPA-NXX-X if the first TN is associated with a wireless endpoint.

Embodiments of systems are operable to carry out methods described herein. Embodiments of computer program products are in the form of computer-readable media having computer executable instructions that cause a computing device to carry out methods described herein.

While the invention is amenable to various modifications and alternative forms, specific embodiments have been shown by way of example in the drawings and are described in detail below. The intention, however, is not to limit the invention to the particular embodiments described.

DETAILED DESCRIPTION

Embodiments of the present invention include systems and methods for Major Trading Area routing in a telecommunications network. In some embodiments, intra-MTA calls are routed directly to a terminating carrier network if one or more of the terminating carrier network or the originating carrier network are wireless carrier networks. Routing a call directly to the terminating carrier network involves routing the call over an available direct connection to the terminating carrier network. Routing directly to the terminating carrier network may involve bypassing a Local Exchange Carrier (LEC) network, which may be a Regional Bell Operating Company (RBOC) network.

In some embodiments, it is determined whether a call is eligible for direct routing to a terminating carrier network. Determining whether a call is eligible for direct routing can include determining whether one or more of the originating carrier network or the terminating carrier network are wireless carrier networks and whether the call is intra-MTA. Direct routing eligibility be determined by, or be based on, the availability of a direct connection to the terminating carrier network. Direct routing eligibility may further depend on the existence of a traffic exchange agreement (TEA) (or similar agreement) with the terminating carrier network that allows for direct routing of intra-MTA traffic.

Determining whether one or more of the originating carrier network or the terminating carrier network are wireless carrier networks can include determining whether the originating endpoint number and the terminating endpoint number are owned by a wireless carrier in the MTA where the call is received. This may involve looking up the originating endpoint number and the terminating endpoint number in a list of numbers associated with wireless carriers in the MTA. The list of numbers associated with wireless numbers may be generated by gathering wireless carrier owned numbers from a set of local exchange data (e.g. LERG). The process may further involve provisioning a core routing engine (CRE) with intra-MTA numbers for one or more switches to which direct connections exist.

Figure 1:
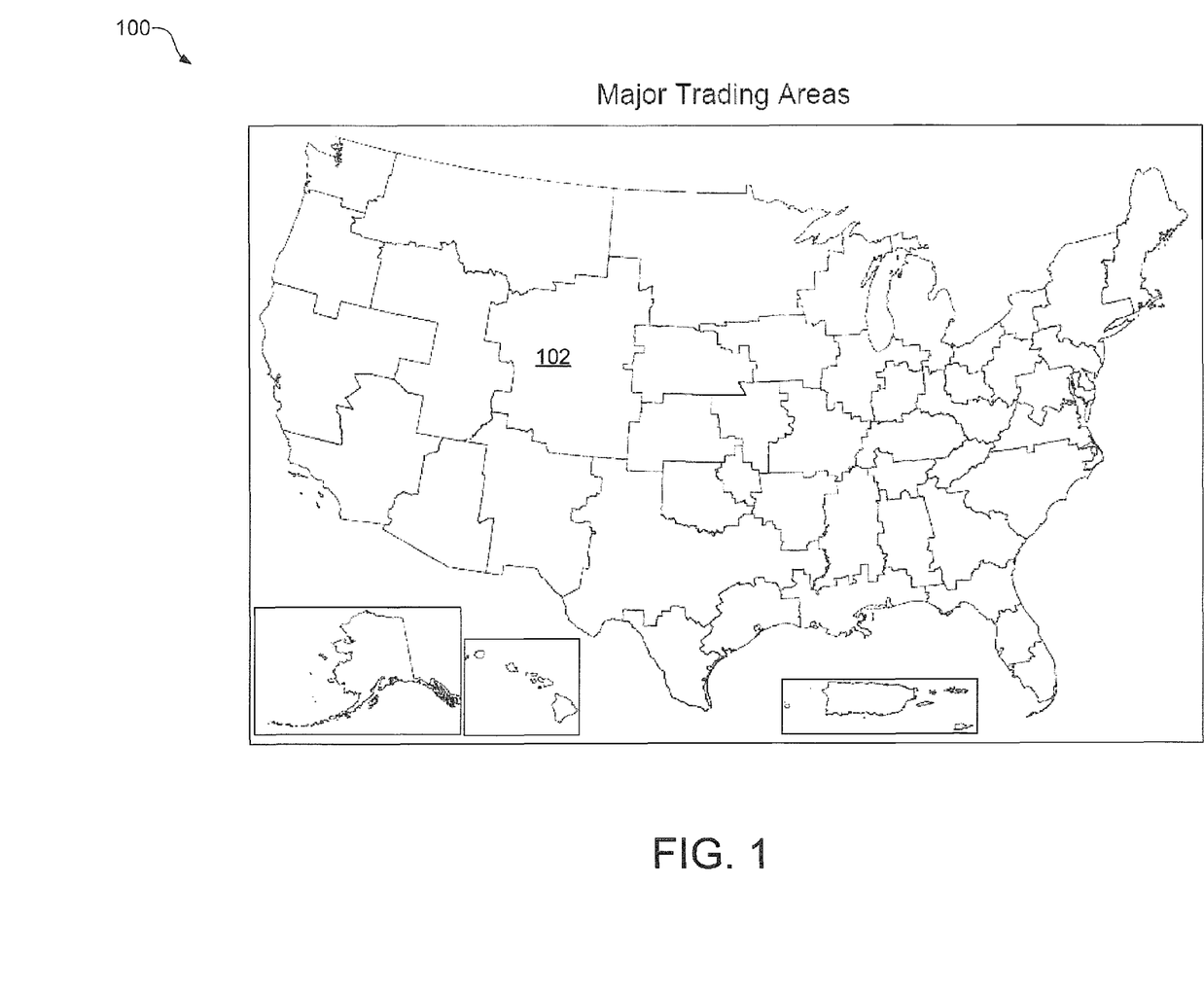
FIG. 1 illustrates Major Trading Areas (MTAs) in the United States.

Local calling regions used by LECs to determine jurisdiction of calls are Local Area Transport Areas (LATAs). There are currently 196 defined LATAs. The FCC has also defined 51 Major Trading Areas (MTAs) to designate personal communications services market areas. MTAs are generally larger than LATAs and in some cases MTAs cross state boundaries. FIG. 1 is a map 100 of the MTAs 102 in the United States. As shown in FIG. 1, MTA boundaries correspond to state boundaries in many cases, but large states, such as California, Texas and Florida, can contain multiple MTAs.

For a transit carrier whose network spans a large geographic region and many local areas, calls can be routed locally, interstate, and intrastate. Typically, local routing is the cheapest, interstate routing is the next most expensive, and intrastate routing is the most expensive. The differences in routing costs for the different types of routing are a result of state and federal regulations, the connecting networks used and telecommunication carrier agreements. Furthermore, for any given call, a transit carrier may have the option of routing the call locally, interstate and/or intrastate. Where the option exists it would be preferable to route the call in the least expensive manner possible, which is generally locally.

Currently there are a large number of minutes that are considered intrastate or interstate, but that are eligible to be routed as intra-MTA, which corresponds to local routing costs. Given that traffic exchange agreements with terminating carriers allow these minutes to be terminated for "free" (i.e., without requiring payment to a LEC), being able to route these intrastate and interstate minutes of use (MOUs) via the direct connects provides a telecommunications carrier with considerable cost savings and provides a competitive cost advantage with which to capture more MOUs on the telecommunication carrier's products.

Figure 2:
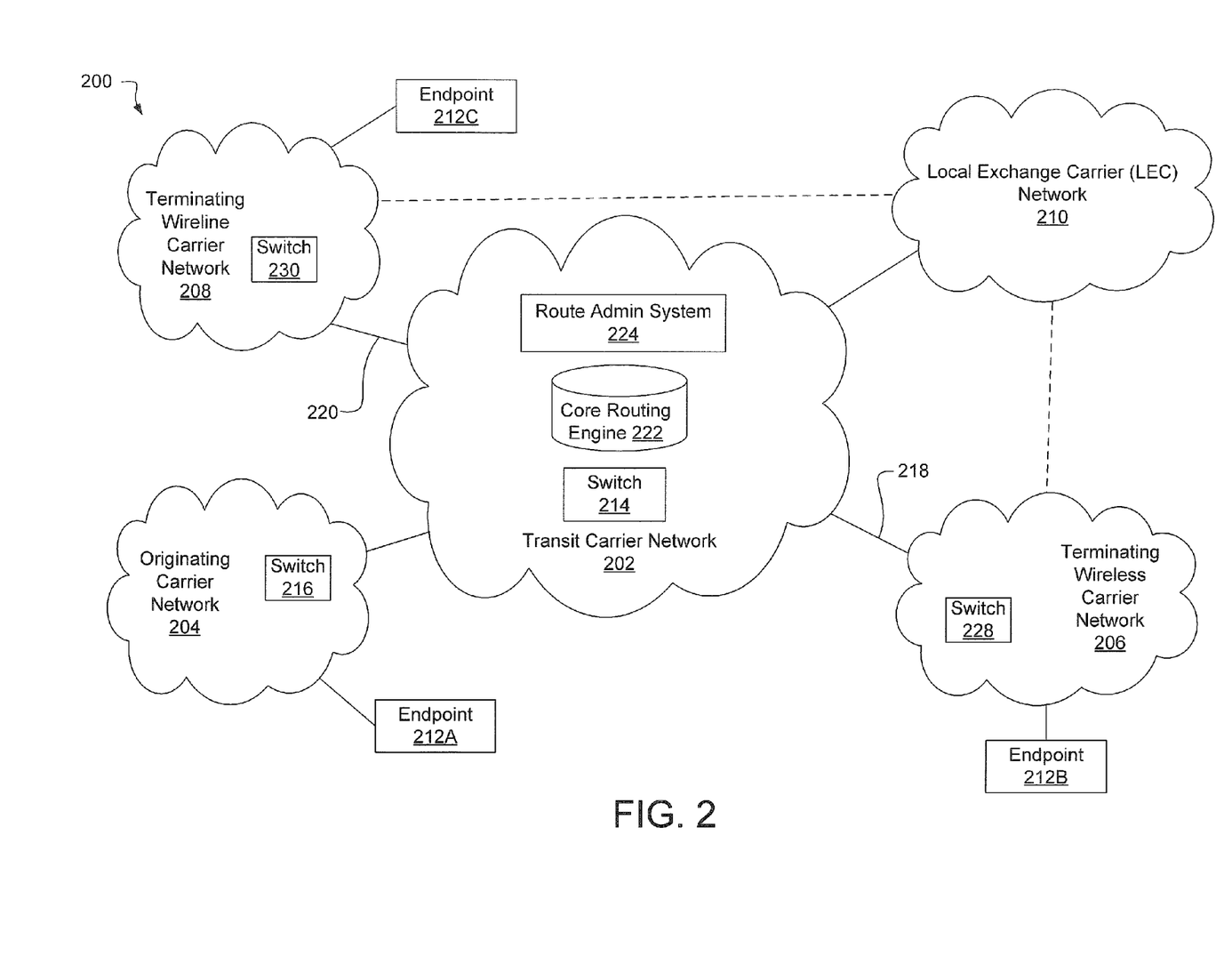
FIG. 2 illustrates a network configuration suitable for carrying out MTA routing in accordance with various embodiments.

FIG. 2 illustrates an exemplary operating environment 200 in which intra-MTA call jurisdictionalizing and routing can be carried out in accordance with various embodiments of the present invention. The simplified operating environment 200 of FIG. 2 includes a transit carrier network 202, an originating customer carrier network 204, a terminating wireless carrier network 206 (e.g., Verizon Wireless, etc.), a terminating wireline carrier network 208 (e.g., Comcast™) and a local exchange carrier (LEC) network 210 (e.g., a Regional Bell Operating Company (RBOC)).

For ease of illustration, only one originating carrier network 204 is shown, but it will be understood that originating carrier network 204 can represent either a wireless carrier network or a wireline carrier network. In other words, the transit carrier network 202 may carry calls that originate from both wireless customers and wireline customers. Customers of the transit carrier network 202 can include Interexchange carriers (IXCs), Cable mobile switching offices (MSOs), VoIP service providers (VSPs), or others. As discussed further below, embodiments of systems and methods include functionality for jurisdictionalizing intra-MTA calls as local, including long-distance intra-MTA calls. Systems and methods can then determine whether a direct connection is available for routing the call to the terminating network, and whether the call is eligible for routing over the direct connection. In one embodiment, this involves determining whether the originating carrier network (or the associated endpoint) is wireless or wireline to determine eligibility for direct connection routing.

In general, the transit carrier network 202 spans a wide geographic region and includes network interconnection points in numerous local calling areas (e.g., metropolitan areas) to provide for call routing between different localities on a local and long-distance basis. More specifically, the transit carrier network 202 interconnects with local or long distance networks in jurisdictions that may be designated as, for example, Major Trading Areas (MTAs) or Local Access and Transport Areas (LATAs).

A call may be established between an originating endpoint (also referred to as calling party), such as endpoint 212A, and a terminating endpoint (also referred to as called party), such as endpoint 212B or endpoint 212C. Terminating a call refers to establishing a connection between the originating endpoint and the terminating endpoint. Endpoints are communications devices such as, but not limited to, conventional telephones, VoIP phones, soft phones, cell phones, personal digital assistants (PDAs), etc.

When a call is made from calling endpoint 212A to called endpoint 212B, a transit network switch 214 (e.g., a softswitch) receives signaling information, for example from customer switch 216, and routes the call to endpoint 212B either directly via wireless terminating network 206 or indirectly via the LEC network 210. Similarly, when a call is made from calling endpoint 212A to called endpoint 212C, the transit network switch 214 routes the call to endpoint 212C either directly via wireline terminating network 208 or indirectly via the LEC network 210 or via an IXC network (not shown) to LEC network 210.

The switch 214 jurisdictionalizes calls as local or long-distance and determines whether to route calls either directly or indirectly based on whether a direct connection is available for direct routing and eligibility of the call to be routed over the direct connection. Intra-MTA calls, including intrastate and interstate long-distance calls, are jurisdictionalized as local based on associations between groups of telephone numbers (TNs). Eligibility for direct routing is based on terms of use of the direct connection, which can specify call jurisdiction and the type (e.g., wireline or wireless) of originating and terminating networks.

In FIG. 2, a first direct connection 218 is shown between transit carrier network 202 and terminating wireless network 206 and a second direct connection 220 is shown between transit carrier network 202 and terminating wireline network 208. Direct connections may be established between transit carrier network 202 and terminating carrier networks 206, 208 based on traffic exchange agreements (or other agreements) between the carriers. Such agreements specify terms of use of the direct connection. Terms of use typically specify call criteria identifying calls that are permitted to be routed over the direct connections and pricing related to such direct routing.

For example, it may be specified that direct connection 218 can be used to route any intra-MTA calls (both wireline originated and wireless originated) directly to the terminating wireless carrier network 206. As another example, it may be specified that direct connection 220 can be used to route only intra-MTA calls that originate from a wireless carrier network to the terminating wireline carrier network 208. An intra-MTA call is a call in which the originating endpoint and the terminating endpoint are associated with one or more related MTAs. For example, both endpoints may be in the same MTA. As another example, the endpoints may each be in different MTAs, but the call is still an intra-MTA call if the two MTAs are related by a rate center that intersects the MTAs. This may occur when MTAs are adjacent.

By using direct connections to the terminating carrier networks for intra-MTA calls, costs can be reduced. For example, costs associated with routing indirectly through the LEC network 210 can be avoided. Typically, if a call is routed through the LEC network 210, the terminating wireline carrier is required to pay the LEC a fee under certain regulations. The terminating carriers typically pass such fees on to the transit carrier. As such, in many instances routing a call through a direct connection is less expensive.

The transit switch 214 is in communication with a core routing engine (CRE) 222 that is configured with routing data that enables the switch to determine how to route calls, and more specifically to determine whether a call can be directly routed to a terminating network. In embodiments described herein, the routing data provisioned on the CRE 222 may be selected and adapted to take advantage of favorable cost agreements between the transit carrier and terminating carriers where possible. A route administration system 224 associated with the transit carrier network 202 provides the routing data that is provisioned on the CRE 222. The route administration system 224 uses various sources of data, including trunk group data and intra-MTA participating switch data, to generate route plans configured on the CRE 222. A particular embodiment of the route administration system 224 is shown in FIG. 3 and discussed in detail below.

Example functions that may be performed by the route administration system 224 and the transit switch 214 are described further below (see, e.g., FIGS. 5-6). In general, the route administration system 224 generates relationships between intra-MTA endpoints and provisions the relationships on the CRE 222. In one embodiment, clusters of telephone numbers (or TN portions) are created and associated with each other in "FROM-TO" relationships, which are provisioned on the CRE 222. Briefly, the route administration system 224 gathers data relevant to switches, such as switch 228 and switch 230, that the direct connections 218 and 220 are connected to, and stores the data on the CRE 222, based on intra-MTA jurisdiction. Route plan data may be stored in partitions and in tables that can be read or indexed by the switch 214 to look up the preferred route plan. Partitions on the CRE 222 may be set up on an MTA by MTA basis.

Figure 3:
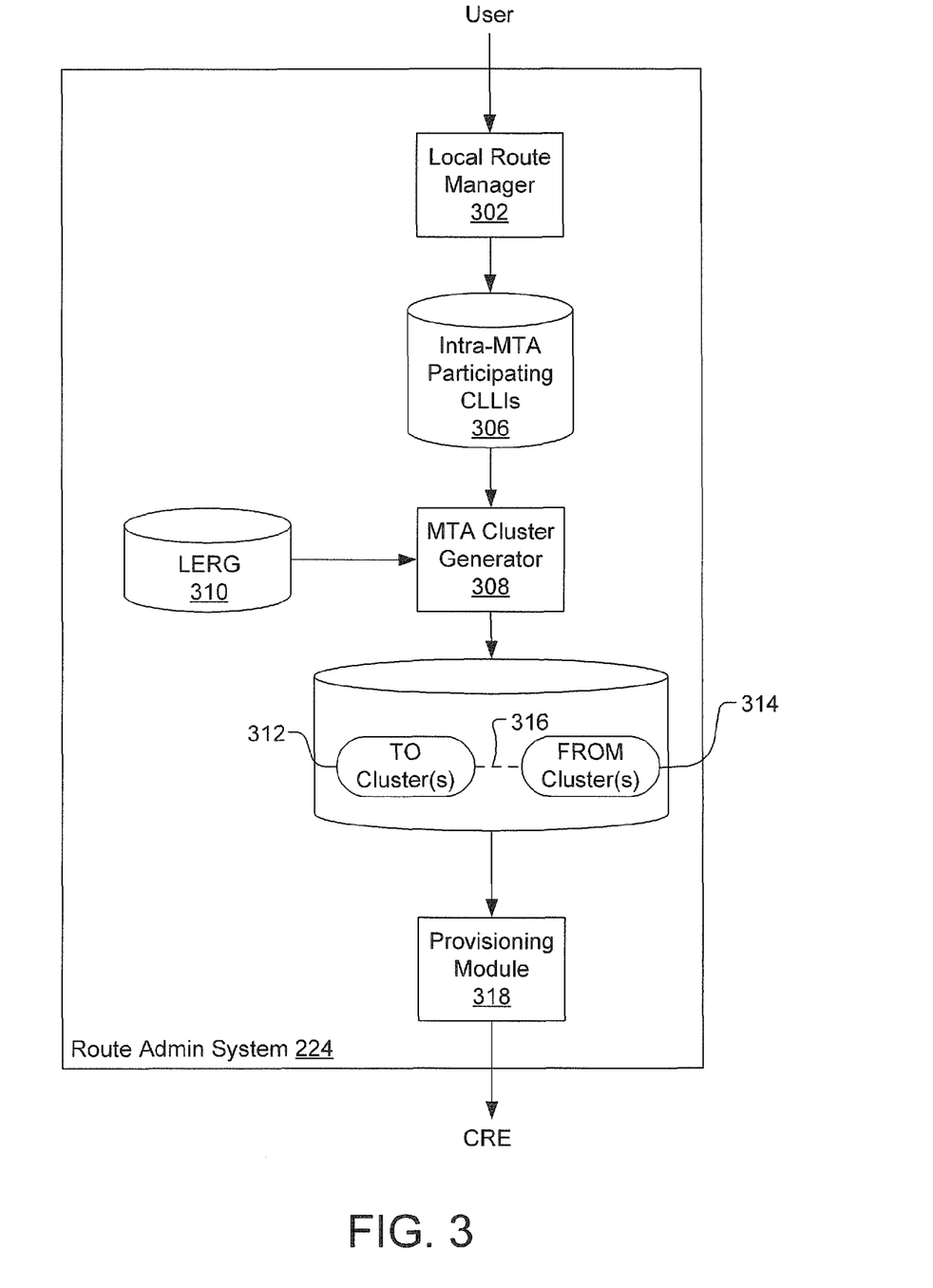
FIG. 3 illustrates an example route administration system in accordance with an embodiment.

FIG. 3 is a functional block diagram of a route administration system 224 in accordance with one embodiment. The route administration system 224 includes a local route manager (LRM) utility 302 for receiving intra-MTA participating switches. In this embodiment, the LRM utility 302 comprises an application program running on a computer. The LRM utility 302 provides a user interface through which a user 304 can enter CLLIs specifying which switches participate in intra-MTA routing. The participating switches and CLLIs are based on agreements between network carriers that designate switches that can be used for intra-MTA routing. Generally when the user 304 enters a switch or CLLI, the user designates (e.g., sets/unsets a "wireless originated" flag) whether the originating network must be wireless or not in order to be eligible for intra-MTA routing. Whether or not the originating network must be wireless is also based on the agreement between the carriers.

The participating CLLIs and "wireless originated" flags are stored in intra-MTA participating CLLI data 306. An MTA cluster generator 308 generates intra-MTA clusters of "TO" TN ranges and "FROM" TN ranges associated with the CLLIs. The TN ranges are designated in the form NPA-NXX or NPA-NXX-X, depending on the situation, which is discussed in more detail further below.

More specifically, the MTA cluster generator 308 uses switch data, such as the LERG 310, to determine all "TO" (called) TNs, in 7-digit form NPA-NXX-X, associated with each intra-MTA participating CLLI and groups these TNs in CLLI-associated "TO" cluster(s) 312. A "TO" cluster 312 includes all TNs that can be called through the associated intra-MTA participating CLLI. The MTA cluster generator 308 also determines all eligible "FROM" (calling) TNs (in either 6-digit form or 7-digit form, discussed below) within the MTA(s) associated with each intra-MTA participating CLLI and stores them in "FROM" clusters 314. The MTA cluster generator 308 then creates "FROM-TO" relationships 316 between associated "TO" clusters 312 and "FROM" clusters 314. In one embodiment, the cluster generator 308 includes a computer process that implements and automates the process(es) for Intra-MTA cluster calculation. The process can automatically update cluster generation based on user provisioning activities related to contractual changes between carrier networks (e.g., transit carrier network and terminating carrier network) and owners of Intra-MTA participating CLLIs. Furthermore, the process automatically updates cluster generation based on routine updates and changes to LERG switch inventory data.

With further regard to 6-digit TN format and 7-digit TN format, 7-digit format (NPA-NXX-X) is used in "FROM" clusters when the originating network is required to be wireless for the TN to be eligible. Only 6-digits are used in "FROM" clusters when the originating network is not required to be wireless for eligibility. This is shown in further detail below in the discussion of FIG. 6.

The provisioning module 318 provisions the TO clusters 312, FROM clusters 314 and relationships 316 on the CRE 222. In one embodiment, the provisioning module 318 stores the clusters and relationships in tables in designated partitions in memory in the CRE 222. The provisioning module 318 has functionality for translating the cluster formatted data into a format that is configurable on the CRE 222.

Figure 4:
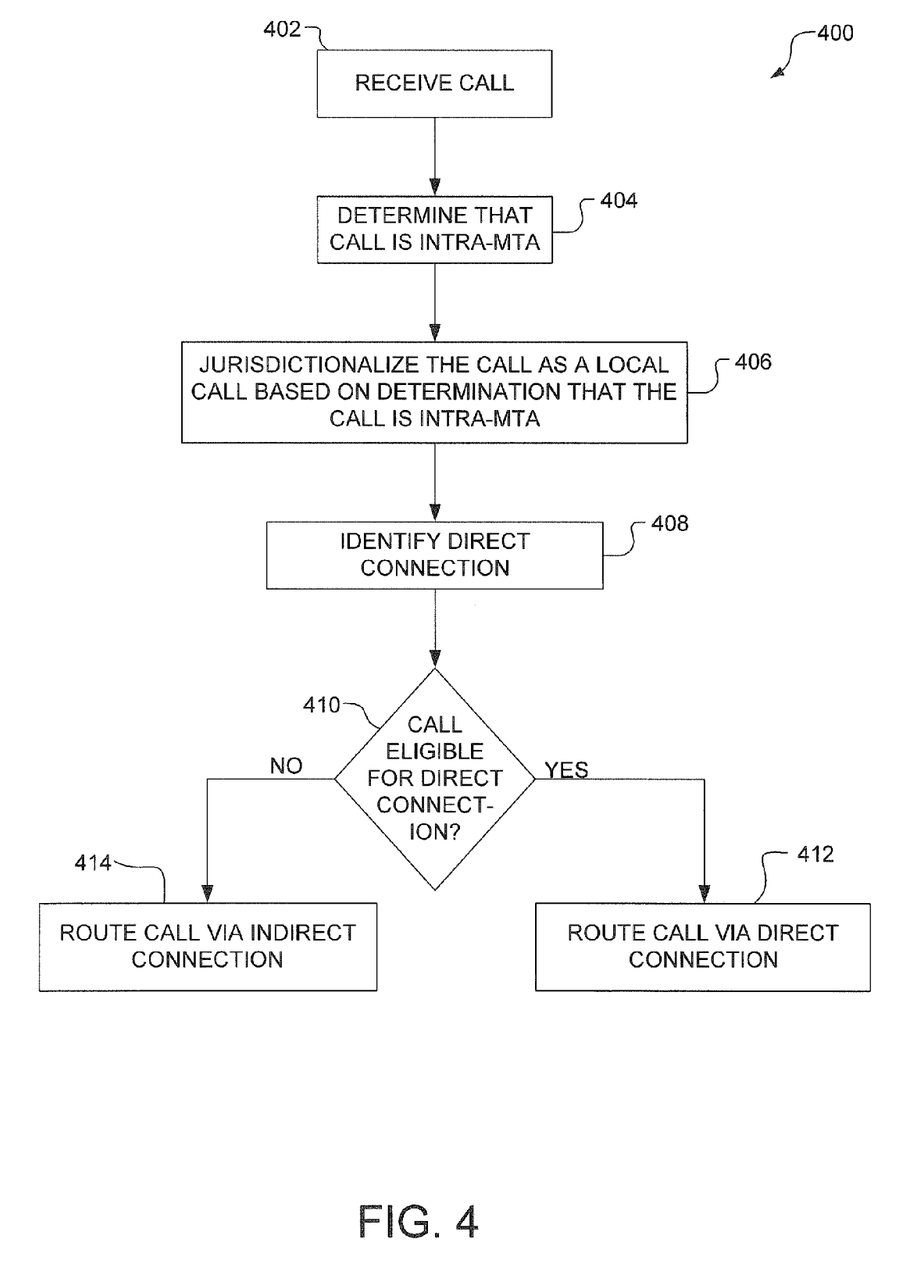
FIGS. 4-6 are flowcharts illustrating algorithms that can be carried out for MTA cluster generation and provisioning as well as intra-MTA jurisdictionalization and routing in accordance with various embodiments.

FIG. 4 is a flowchart illustrating an algorithm 400 for use in routing intra-MTA calls via a direct connection. In some embodiments the algorithm 400 is carried out by a switch, a core routing engine, or a combination of these in a transit carrier network. In general a call can be routed to a terminating carrier network via a direct connection if terms of use of the direct connection are satisfied. Direct routing may involve bypassing another network, such as a Local Exchange Carrier (LEC) (e.g., a Regional Bell Operating Company (RBOC)) network.

In receiving operation 402 a call is received. Receiving a call can involve receiving call signaling that serves as a request for a call to be set up. The call identifies the calling party (i.e., originating endpoint) and the called party (i.e., terminating endpoint) of the call. In determining operation 404 the call is determined to be an intra-MTA call. The call may be considered "local" from the standpoint of HTLT data, which is conventionally used to determine local calls. The call may also be an interstate or intrastate long-distance call. In one embodiment, the determining operation 404 determines that the call is intra-MTA based on "TO" and "FROM" cluster tables (discussed further below) that have been provisioned on the CRE.

In a jurisdictionalizing operation 406, the call is jurisdictionalized as a local call based on the determination that it is intra-MTA, regardless of whether the call is what is conventionally considered to be a long-distance call. For example, if the call is an interstate or intrastate long-distance call, but the call is intra-MTA (calling party and called party are associated with one or more common MTA(s)), the call will be designated as a local call. By jurisdictionalizing the call as local, the switch chooses a local partition in the CRE to identify a local route. The local route may be a direct connection. In an identifying operation 408 a direct connection to a terminating carrier network is identified that can terminate the call with the called party. An embodiment of the identifying operation 408 determines the terminating carrier network based on the called party telephone number and then determines if a direct connection is available between the transit carrier network and the terminating carrier network. In some embodiments, the switch looks up the called party telephone number in a table that associates TNs with carrier networks to determine the terminating carrier network. In some embodiments identifying operation 408 identifies a trunk connected to the terminating carrier network that is designated as a direct connect trunk In a determining operation 410 it is determined whether the call is eligible for direct routing over the direct connection. In one embodiment eligibility is based on whether the call satisfies terms of use of the direct connection. In one embodiment determining operation 410 determines whether one or both of the originating carrier network and the terminating carrier network are wireless networks.

If the call is not eligible for direct routing, the algorithm 400 branches "NO" to a routing operation 412, where the call is routed indirectly to the terminating carrier network. Indirect routing may involve least cost routing (LCR) or long distance routing via an interexchange carrier (IXC). If the call is eligible for direct routing, the algorithm 400 branches "YES" to a direct routing operation 414 where the call is routed directly to the terminating carrier network via the direct connection. Optionally, the intra-MTA call may be identified (e.g., counted) as a local call in a call detail record (CDR).

Figure 5:
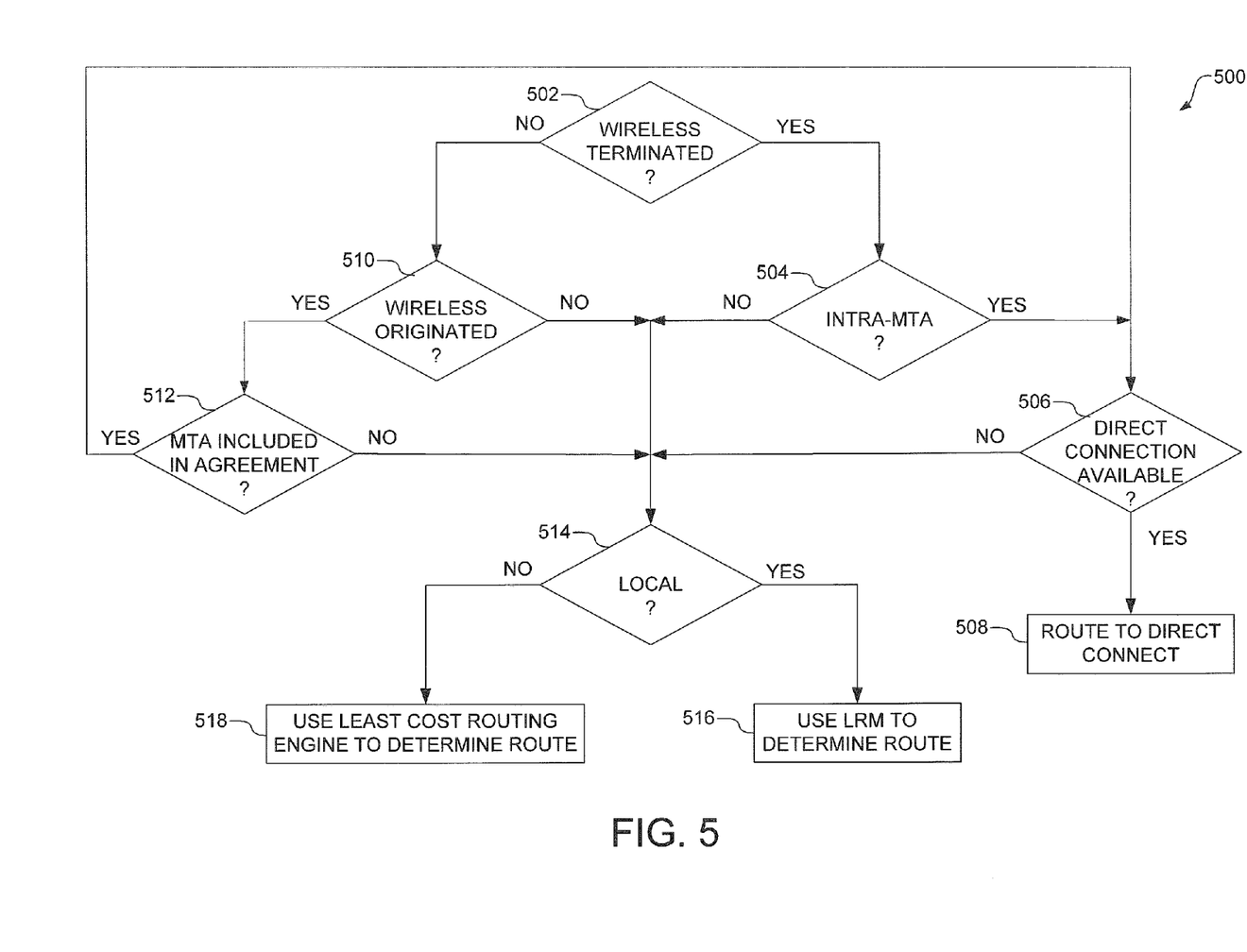

FIG. 5 is a flowchart illustrating an algorithm 500 for determining whether to route a call via a direct connection in accordance with one embodiment. The algorithm 500 may be viewed as an embodiment of the identifying operation 408, determining operation 410 and routing operations 412, 414 of FIG. 4.

In determining operation 502 it is determined whether the call is wirelessly terminated. One embodiment of determining operation 502 determines whether the called party telephone number belongs to a wireless carrier. If the call is wirelessly terminated, the algorithm 500 branches "YES" to another determining operation 504. Determining operation 504 determines whether the call is an intra-MTA call. This may involve looking up at least a portion of one or both of the calling party telephone number or the called party telephone number in a table that associates telephone number (or portions thereof) with MTAs.

If the call is determined to be an intra-MTA call, the algorithm 500 branches "YES" to another determining operation 506 where it is determined whether a direct connection is available. If a direct connection is available, the algorithm 500 branches "YES" to a direct routing operation 508 where the call is routed directly to the terminating carrier network.

Referring again to determining operation 502, if it is determined that the call is not wirelessly terminated, the algorithm 500 branches "NO" to another determining operation 510. Determining operation 510 determines whether the call is wirelessly originated. One embodiment of the determining operation 502 determines whether the calling party telephone number belongs to a wireless carrier. If it is determined that the call is wirelessly originated, the algorithm 500 branches "YES" to another determining operation 512. Determining operation 512 determines whether the MTA of the called party is included in an agreement, such as a traffic exchange agreement (TEA), between the transit carrier and the terminating carrier.

If it is determined that the MTA is included in an agreement with the terminating carrier, the algorithm branches "YES" to determining operation 506, which determines whether a direct connection is available to the terminating carrier network. If determining operation 504 determines that the call is not an intra-MTA call or determining operation 506 determines that a direct connection is not available or determining operation 510 determines that the call is not wirelessly originated or determining operation 512 determines that the MTA is not included in the agreement, the algorithm branches "NO" to another determining operation 514.

Determining operation 514 determines whether the call is local. If the call is local, the algorithm 500 branches "YES" to routing operation 516. Routing operation 516 uses the local route manager (LRM) to route the call locally. In one embodiment, the routing operation 516 if the called and calling parties are in the same Local Calling Area (LCA), the call is routed accordingly. If the call is not local, the algorithm branches "NO" to routing operation 518, which uses least cost routing (LCR) to route the call.

Figure 6A:
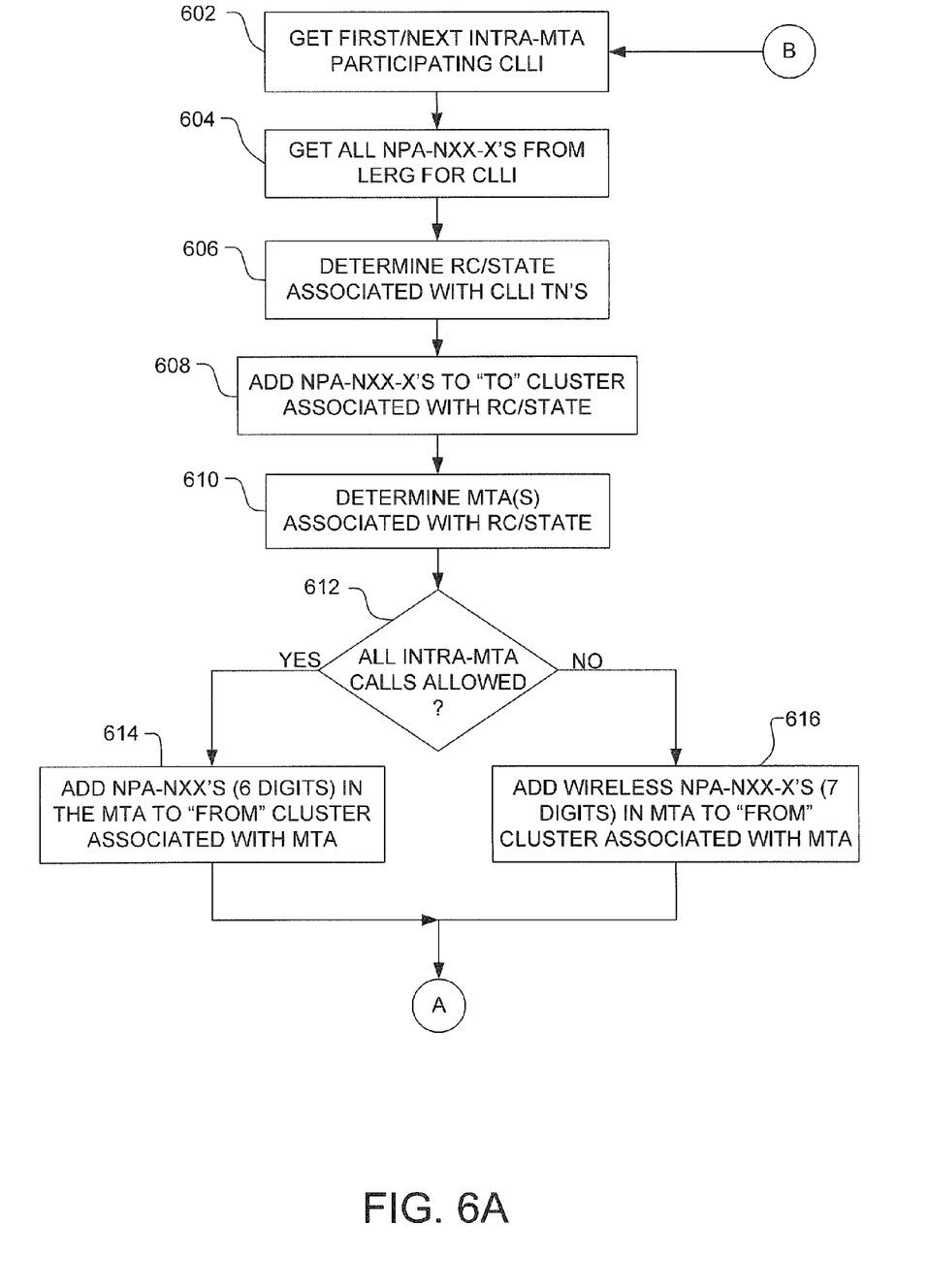
Figure 6B:
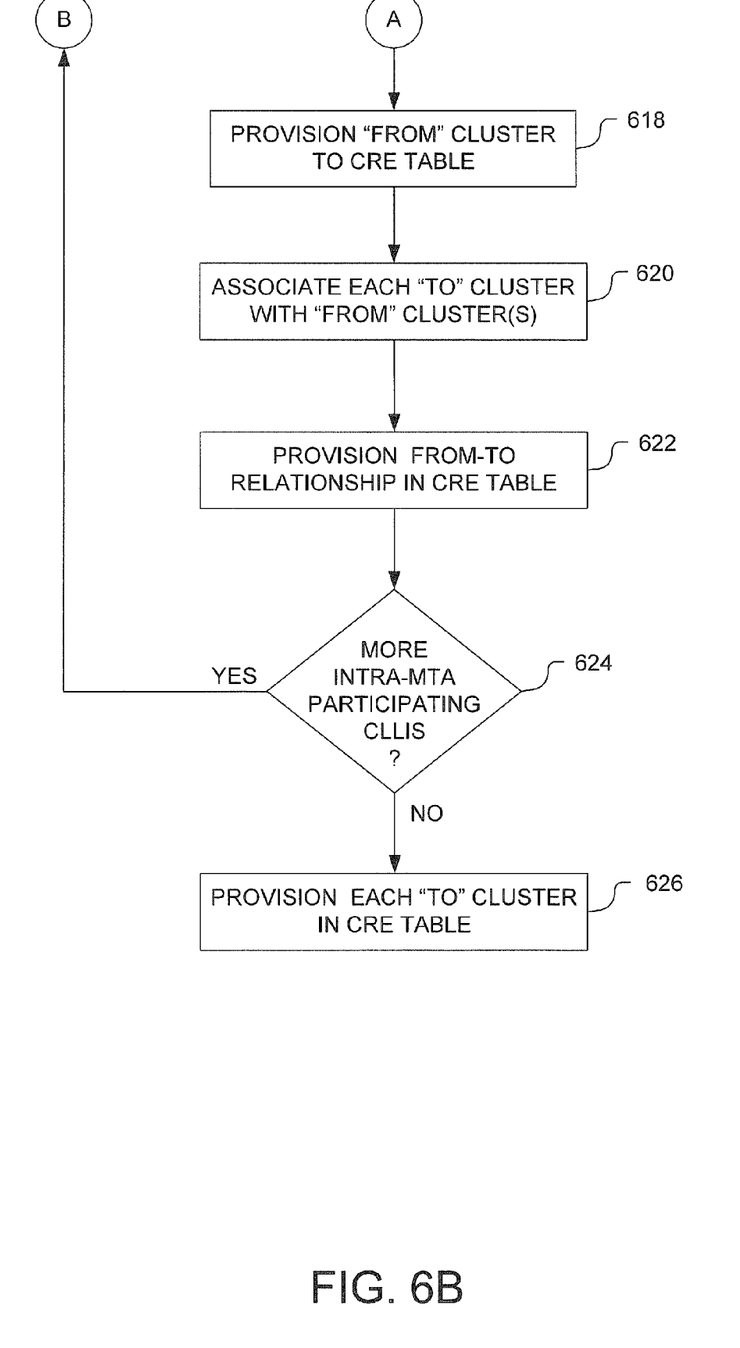

FIG. 6A-6B is a flowchart illustrating an algorithm 600 for generating TO and FROM clusters that associate intra-MTA "TO" and "FROM" telephone number ranges. The clusters can be generated by the MTA cluster generator and provisioned on the core routing engine, where the switch can use the data to determine how to route calls. The algorithm 600 can be carried out on a regular basis and/or on an event driven basis, such as whenever a direct connection is created to a terminating carrier network. In this embodiment, it is assumed that a new direct connection has been created and there are terms of use of the direct connection that will dictate which route plans can be generated that use the direct connection.

In this embodiment, the MTA cluster generator uses the LERG (or a copy of LERG data) to generate the route plan data. In general, the LERG contains a mapping of NPA-NXX-X's to switch Common Language Location Identifier (CLLI) codes. As known by those skilled in the art, the format "NPA-NXX-X" refers to the most significant portion of a telephone number (TN), where "NPA" stands for a given Number Plan Area (or Area Code), "N" stands for a given number, and "X" stands for any number.

In operation 602 a CLLI is read from a database (e.g., database 306, FIG. 3) of intra-MTA participating CLLIs. As discussed above, the intra-MTA participating CLLIs are entered through the LRM based on agreements between carrier networks. Another operation 604 determines all 7-digit telephone numbers (TNs) in the form NPA-NXX-X that the switch can terminate. In one embodiment, operation 604 looks up NPA-NXX-X's associated with the CLLI in the LERG, which provides, among other information, a mapping of NPA-NXX-X to switch CLLIs.

A determining operation 606 determines distinct Rate Center (RC) identifiers and states for the NPA-NXX-X's for the CLLI. Operation 608 adds the CLLI's associated NPA-NXX-X's to a "TO" cluster associated with the RC/State. If a "TO" cluster has not been created yet for the current CLLI, a "TO" cluster is created and the NPA-NXX-X's are added to it. In determining operation 610, the MTA or MTAs associated with the RC/State are determined. One or two distinct MTAs are found for each RC.

Query operation 612 determines whether all intra-MTA calls can be routed over the direct connection for the current CLLI, or whether only wirelessly originated intra-MTA calls can be routed over the direct connection. The query operation 612 determines which calls can be routed over the direct connection based on a designation or flag in the participating CLLI database. Typically, wireless terminating carrier networks will allow all intra-MTA calls to be routed over the direct connection; however, wireline terminating carrier networks typically only allow wirelessly originated intra-MTA calls to be routed over the direct connection. Of course, these are only two possible scenarios, and the invention is not limited to only these. In other embodiments, there may be other terms of use of the direct connection that specify in different ways which intra-MTA calls can be routed over the direct connection.

If all intra-MTA calls are permitted for routing to the CLLI, the algorithm 600 branches "YES" to an adding operation 614. The adding operation 614 adds 6-digit TNs in the MTA to a "FROM" cluster associated with the MTA. If a FROM cluster has not been created yet for the MTA, a FROM cluster is created prior to adding the 6-digit intra-MTA calling numbers to the FROM cluster. Adding operation 614 may consist of several steps, involving first determining the MTA(s) of the switch and then determining all 6-digit TNs within the determined MTA(s) of the RC. The MTA(s) of the RC and the 6-digit TNs within the MTA(s) can be determined from the LERG.

If not all intra-MTA calls are permitted for routing to the CLLI, it is assumed in this embodiment that only wirelessly originated calls can be routed to the CLLI. In this case, the algorithm 600 branches "NO" to another adding operation 616, where the cluster generator determines all 7-digit wireless TNs (i.e., TNs that are owned by a wireless carrier) within the RC's MTA(s). The adding operation 616 also uses the LERG to determine the RC's MTA(s) and the 7-digit wireless TNs. In one embodiment, the adding operation 616 creates a look-up table that can be used to look up MTAs of wireless TNs.

Provisioning operation 618 (FIG. 6B) provisions the FROM clusters on the core routing engine (CRE). In one embodiment, provisioning operation 618 involves generating one or more partitions on the CRE that includes a table that includes a cluster identifier, an NPA and an NXXX field. In an associating operation 620 each TO cluster is associated with the FROM cluster generated above. Associating operation 620 may involve generating a from-to relationship in a table. The table may have a "FROM" cluster column including "FROM" (calling) 6-digit or 7-digit TNs and a "TO" cluster column including 7-digit "TO" (called) TNs.

In provisioning operation 622 the FROM-TO relationship table is provisioned on the CRE 222. A query operation 624 determines whether anymore participating intra-MTA CLLIs remain in the participating intra-MTA database. If so, the algorithm 600 branches "YES" back to operation 602 where the next participating CLLI is selected. If no more participating CLLIs remain, the algorithm 600 branches "NO" to another provisioning operation 626, which provisions each "TO" cluster from operation 608 onto the CRE.

Exemplary Computing Device

Figure 7:
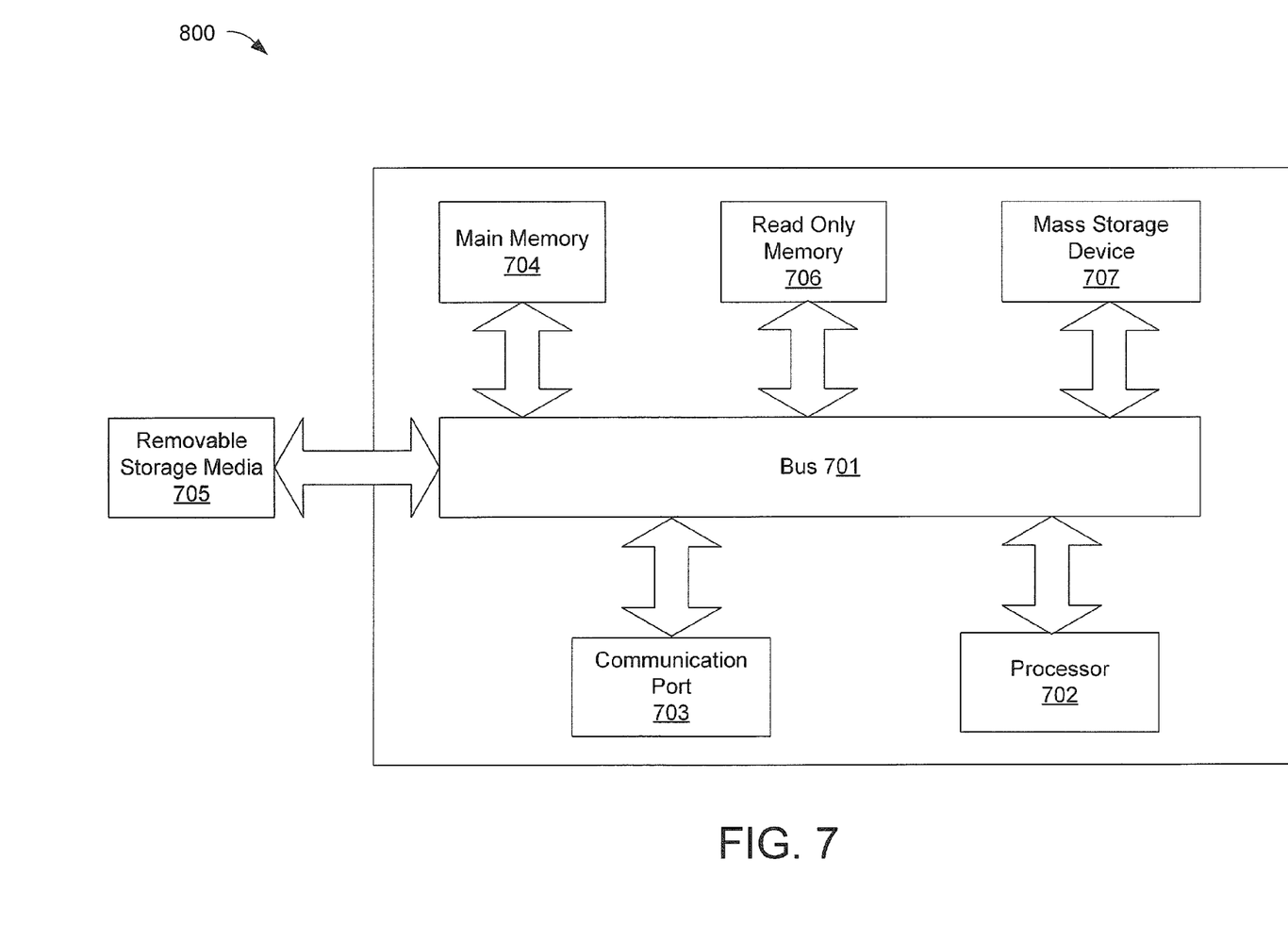
FIG. 7 illustrates a general purpose computing device upon which one or more aspects of embodiments of the present invention may be implemented.

FIG. 7 is a schematic diagram of a computing device 700 upon which embodiments of the present invention may be implemented and carried out. For example, the computing device 700 may be used to perform MTA cluster generation, intra-MTA jurisdictionalizing and/or MTA call routing according to embodiments described herein or for performing functions of the provisioning module described above, for provisioning local route plans on a CRE. As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware.

According to the present example, the computing device 700 includes a bus 701, at least one processor 702, at least one communication port 703, a main memory 704, a removable storage media 705, a read only memory 706, and a mass storage 707. Processor(s) 702 can be any known processor, such as, but not limited to, an Intel® Itanium® or Itanium 2® processor(s), AMD® Opteron® or Athlon MP® processor (s), or Motorola® lines of processors. Communication port(s) 703 can be any of an RS-232 port for use with a modem based dialup connection, a 10/100 Ethernet port, a Gigabit port using copper or fiber, or a USB port. Communication port(s) 703 may be chosen depending on a network such a Local Area Network (LAN), Wide Area Network (WAN), or any network to which the computing device 700 connects. The computing device 700 may be in communication with peripheral devices (not shown) such as, but not limited to, printers, speakers, cameras, microphones, or scanners.

Main memory 704 can be Random Access Memory (RAM), or any other dynamic storage device(s) commonly known in the art. Read only memory 706 can be any static storage device(s) such as Programmable Read Only Memory (PROM) chips for storing static information such as instructions for processor 702. Mass storage 707 can be used to store information and instructions. For example, hard disks such as the Adaptec® family of SCSI drives, an optical disc, an array of disks such as RAID, such as the Adaptec family of RAID drives, or any other mass storage devices may be used.

Bus 701 communicatively couples processor(s) 702 with the other memory, storage and communication blocks. Bus 701 can be a PCI/PCI-X, SCSI, or USB based system bus (or other) depending on the storage devices used. Removable storage media 705 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Embodiments of the present invention include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Embodiments of the present invention may be provided as a computer program product, which may include a machine-readable medium having stored thereon instructions, which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

Some terms used in this specification are defined here:

A "module" is a self-contained functional component. A module may be implemented in hardware, software, firmware, or any combination thereof.

The terms "connected" or "coupled" and related terms are used in an operational sense and are not necessarily limited to a direct connection or coupling.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phrases do not necessarily refer to the same embodiment.

If the specification states a component or feature "may", "can", "could", or "might" be included or have a characteristic, that particular component or feature is not required to be included or have the characteristic.

The terms "responsive" and "in response to" includes completely or partially responsive.

A computer program product can take the form of one or more computer-readable media. The term "computer-readable media" is media that is accessible by a computer, and can include, without limitation, computer storage media and communications media. Computer storage media generally refers to any type of computer-readable memory, such as, but not limited to, volatile, non-volatile, removable, or non-removable memory. Communication media refers to a modulated signal carrying computer-readable data, such as, without limitation, program modules, instructions, or data structures.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

What is claimed is:

1. A system comprising:
a cluster generation module operable to generate:
a first cluster comprising a first set of one or more telephone numbers (TNs) associated with one or more major trading areas (MTAs); and
a second cluster comprising a second set of one or more TNs associated with one or more MTAs, wherein a call between the first set of one or more TNs and the second set of one or more TNs is an intra-MTA call;
one or more tables operable to store at least the first cluster, the second cluster, and a set of terms of use for a direct connection to a selected common language location identifier (CLLI); and
a provisioning module operable to provision the call in a local jurisdiction relationship if the call satisfies the set of terms of use for the direct connection to the selected CLLI.

2. A non-transitory computer-readable medium having instructions stored thereon, the instructions, when executed by a processing device, enabling the processing device to perform the operations of:
determining that a first telephone number (TN) and a second TN are associated with one or more major trading areas (MTAs), such that a call therebetween is an intra-MTA call;
determining whether a call made between the first TN and the second TN satisfies terms of use of a direct connection to a selected common language location identifier (CLLI); and
provisioning the first TN and the second TN in a local jurisdiction relationship if a call between the first TN and the second TN satisfies terms of use of the direct connection.

3. A non-transitory computer-readable medium having instructions stored thereon, the instructions, when executed by a processing device, enabling the processing device to perform the operations of:
determining a set of one or more telephone numbers (TNs) to which a selected common language location identifier (CLLI) can terminate calls, wherein the selected CLLI is associated with one or more major trading areas (MTAs);
creating a FROM-TO relationship between at least a subset of telephone numbers in the one or more MTAs and the set of one or more TNs to which the selected CLLI can terminate calls; and
provisioning the FROM-TO relationship on a core routing engine accessible to a switch.

4. The system as recited in claim 1, wherein the direct connection bypasses a local exchange carrier (LEC) network.

5. The system as recited in claim 1, wherein the provisioning module is operable to provision the first cluster and the second cluster on a core routing engine.

6. The system as recited in claim 5, wherein the cluster generation module is operable to generate at least one of the first and second clusters by:
determining a rate center associated with the selected CLLI; and
looking up TNs associated with the rate center in a local exchange routing guide (LERG) database.

7. The system as recited in claim 1, wherein a TN associated with at least one of the first and second clusters has the form:
NPA-NXX if the TN is not associated with a wireless endpoint; and
NPA-NXX-X if the TN is associated with a wireless endpoint.

8. The non-transitory computer-readable medium as recited in claim 2, wherein the direct connection enables bypassing a local exchange carrier (LEC) network.

9. The non-transitory computer-readable medium as recited in claim 2, further enabling the processing device to perform the operations of:
adding the first TN to a first cluster of TNs and the second TN to a second cluster of TNs.

10. The non-transitory computer-readable medium as recited in claim 9, further enabling the processing device to perform the operations of:
provisioning the first cluster and the second cluster on a core routing engine.

11. The non-transitory computer-readable medium as recited in claim 10, wherein the operation of determining that the first TN and the second TN are associated with one or more MTAs comprises:
determining a rate center associated with the first TN; and
looking up TNs associated with the rate center in a local exchange routing guide (LERG) database.

12. The non-transitory computer-readable medium as recited in claim 2, wherein the first TN has the form:
NPA-NXX if the first TN is not associated with a wireless endpoint; and
NPA-NXX-X if the first TN is associated with a wireless endpoint.

13. The non-transitory computer-readable medium as recited in claim 3, further enabling the processing device to perform the operations of:
provisioning TNs to which the selected CLLI can terminate calls as a group on the core routing engine.

14. The non-transitory computer-readable medium as recited in claim 3, further enabling the processing device to perform the operations of:
provisioning the at least a subset of TNs as a group on the core routing engine.

15. The non-transitory computer-readable medium as recited in claim 3, further enabling the processing device to perform the operations of:
determining a rate center associated with the selected CLLI.

16. The non-transitory computer-readable medium as recited in claim 15, further enabling the processing device to perform the operations of:
determining the at least a subset of TNs by looking up TNs of the rate center in a local exchange routing guide (LERG) data base.

17. The non-transitory computer-readable medium as recited in claim 3, wherein the at least a subset of TNs comprises TNs associated with wireless endpoints.

18. The non-transitory computer-readable medium as recited in claim 3, further enabling the processing device to perform the operations of:
determining the at least a subset of TNs based on an attribute specified in a traffic exchange agreement.

19. The non-transitory computer-readable medium as recited in claim 18, enabling the processing device to perform the operations of:

if the attribute specifies only wireless originated calls, determining TNs in the one or more MTAs associated with wireless networks.

20. The non-transitory computer-readable medium as recited in claim 3, further enabling the processing device to perform the operations of:
creating a first cluster of TNs in the form NPA-NXX-X to which the selected CLLI can terminate calls; and
creating a second cluster of TNs in the form NPA-NXX that are in the one or more MTAs,
wherein creating the FROM-TO relationship comprises:
associating the first cluster with the second cluster.

21. The non-transitory computer-readable medium as recited in claim 20, further enabling the processing device to perform the operations of:
automatically updating the first cluster and the second cluster in response to a change in an inventory of switch data.

22. The non-transitory computer-readable medium as recited in claim 20, further enabling the processing device to perform the operations of:
automatically updating the first cluster and the second cluster in response to a change to a traffic exchange agreement affecting the selected CLLI.

* * * * *